(12) United States Patent
Watanabe et al.

(10) Patent No.: US 6,814,676 B2
(45) Date of Patent: *Nov. 9, 2004

(54) MULTI-PIECE SOLID GOLF BALL

(75) Inventors: Hideo Watanabe, Chichibu (JP); Junji Umezawa, Chichibu (JP); Yasushi Ichikawa, Chichibu (JP); Rinya Takesue, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/319,603

(22) Filed: Dec. 16, 2002

(65) Prior Publication Data

US 2003/0134694 A1 Jul. 17, 2003

Related U.S. Application Data

(60) Provisional application No. 60/352,508, filed on Jan. 31, 2002.

(30) Foreign Application Priority Data

Dec. 27, 2001 (JP) ........................... 2001-396582

(51) Int. Cl.[7] ................... A63B 37/04; A63B 37/06; A63B 37/12; A63B 37/14
(52) U.S. Cl. ........................... 473/374; 473/378
(58) Field of Search ................... 473/351–378

(56) References Cited

U.S. PATENT DOCUMENTS

| 5,553,852 A | | 9/1996 | Higuchi et al. |
| 5,586,950 A | | 12/1996 | Endo |
| 5,601,502 A | * | 2/1997 | Hiraoka et al. ............... 473/373 |
| 5,711,723 A | * | 1/1998 | Hiraoka et al. ............... 473/374 |
| 6,045,460 A | * | 4/2000 | Hayashi et al. ............... 473/376 |
| 6,210,292 B1 | * | 4/2001 | Higuchi et al. ............... 473/374 |
| 6,248,027 B1 | * | 6/2001 | Hayashi et al. ............... 473/371 |
| 6,315,682 B1 | * | 11/2001 | Iwami et al. .................. 473/374 |
| 6,319,155 B1 | * | 11/2001 | Moriyama et al. ............ 473/378 |
| 6,431,998 B1 | * | 8/2002 | Nakamura et al. ........... 473/371 |
| 6,520,872 B2 | * | 2/2003 | Endo et al. ................... 473/374 |
| 6,521,711 B1 | * | 2/2003 | Ohama et al. ................ 525/274 |
| 6,656,059 B2 | * | 12/2003 | Umezawa et al. ............ 473/373 |
| 6,663,507 B1 | * | 12/2003 | Watanabe et al. ............ 473/373 |

FOREIGN PATENT DOCUMENTS

| GB | 2278609 A | 12/1994 |
| JP | 06343718 A | 12/1994 |
| JP | 07-024085 A | 1/1995 |
| JP | 07194736 A | 8/1995 |

* cited by examiner

*Primary Examiner*—Steven Wong
*Assistant Examiner*—Alvin A. Hunter, Jr.
(74) *Attorney, Agent, or Firm*—Sughrue Mion, PLLC

(57) ABSTRACT

Provided is a multi-piece solid golf ball, wherein an outer layer cover has a polyurethane based elastomer as a main component; a solid core surface Shore D hardness is 50 to 60, an inner layer cover Shore D hardness is 53 to 61, and an outer layer cover Shore D hardness is 52 to 58; an average surface Shore D hardness of the solid core and inner and outer layer covers is 53 to 58; a value obtained by dividing a thickness of the outer layer cover by a thickness of the inner layer cover is 0.48 to 1.00, and a total thickness of the outer and inner layer covers is 1.5 mm to 3.5 mm; and a dimple volume occupying ratio VR value is 0.66% to 0.85%. The golf ball is excellent in flight performance, feeling characteristic, and controllability, and is improved in scratch resistance and durability against hitting.

8 Claims, No Drawings

MULTI-PIECE SOLID GOLF BALL

This application is an application filed under 35 U.S.C. 111(a) claiming benefit pursuant to 35 U.S.C §119(e)(i) of the filing date of the Provisional Application 60/352,508 filed on Jan. 31, 2002 pursuant to 35 U.S.C. §111(b).

BACKGROUND OF THE INVENTION

1. Field of the Invention

The present invention relates to a multi-piece solid golf ball having a solid core and a cover which has a two-layer structure of an inner layer cover and an outer layer cover and is formed in such a manner as to cover the solid core. In particular, the present invention relates to a multi-piece solid golf ball, in which a polyurethane based elastomer is used as a main component of a material forming the outer layer cover, and a surface hardness of the solid core, a hardness of each of the inner and outer layer covers, a thickness of each of the inner and outer layer covers, and a dimple $V_R$ value are optimized.

2. Prior Art

In recent years, various golf balls characterized by using a resin cover having, at its outermost layer, a relatively soft characteristic have been developed as golf balls for professional golfers and experienced amateur golfers. Such gold balls have been described, for example, in Japanese Patent Laid-open Nos. Hei 6-343718, Hei 7-194736, and Hei 7-24085.

The golf ball described in Japanese Patent Laid-open No. Hei 6-343718 includes an inner layer cover made from a high acid ionomer and an outer layer cover made from a relatively soft low modulus ionomer or a non-ionomer thermoplastic elastomer such as a polyurethane elastomer. This golf ball is intended to increase the flight distance with no sacrifice both in ball characteristic required for a golf game and in durability of the golf ball.

The golf ball described in Japanese Patent Laid-open No. Hei 7-194736 is intended to increase the flight distance and particularly to enhance the stability of iron-shot and the feeling upon impact. This golf ball uses a zinc ion neutralization type ionomer as a main resin component of each of an inner layer cover and an outer layer cover.

Japanese Patent Laid-open No. Hei 7-24085 describes a three-piece solid golf ball, in which an ionomer resin such as "Himilan 1650" (sold by Du Pont-Mitsui Polychemicals Co., Ltd.) or "Surlyn 8120" (sold by E. I du Pont de Nemours and Company), or a polyester based thermoplastic elastomer such as "Hytrel 4047" (sold by Du Pont-Toray Co., Ltd.) is as a material for forming an outer layer cover. This golf ball is intended to improve the flight performance, feeling characteristic, and durability.

These proposed golf balls, however, has a problem that since the outer layer cover is made from a relatively soft cover material such as an ionomer resin or a thermoplastic elastomer, even through the feeling upon impact and flight performance can be improved, the scratch resistance is poor. For example, after repeated hitting of the golf ball, flaws are liable to occur in the surface of the golf ball due to contact with an edge portion or a head portion of an iron or the like.

Another problem of the above-described known golf balls is that when grass or the like is sandwiched between a club face and the golf ball upon iron-shot, that is, upon so-called flier, the controllability of the golf ball is insufficient, and further, cracking may occur after repeated hitting of the golf ball, that is, the durability against repeated hitting of the golf ball is not sufficiently better.

SUMMARY OF THE INVENTION

To meet the above-described demands, the present inventor has made studies on a multi-piece solid golf ball including a solid core, and a cover which has a two-layer structure of an inner layer cover and an outer layer cover and is formed in such a manner as to cover the solid core, wherein the cover has, in its surface, a number of dimples. As a result, the present inventor has found that it is possible to enhance not only the flight performance, feeling characteristic, and the ball controllability upon normal impact with a short iron such as a #9 iron or a sand wedge (that is, in the case where no foreign matter is sandwiched between a club face and the golf ball) but also the ball controllability upon flier (when grass or the like is sandwiched between a club face and the golf ball), and to improve the scratch resistance and the durability against repeated hitting of the golf ball, by using a polyurethane based elastomer as a main component of a material for forming the outer layer cover, setting a surface Shore D hardness of the solid core in a range of 50 to 60, a Shore D hardness of the inner layer cover in a range of 53 to 61, and a Shore D hardness of the outer layer cover in a range of 52 to 58, and optimizing the hardness and thickness of each layer and the dimples such that an average value of the surface Shore D hardness of the solid core, the Shore D hardness of the inner layer cover, and the Shore D hardness of the outer layer cover is in a range of 53 to 58; a value obtained by dividing a thickness of the outer layer cover by a thickness of the inner layer cover is in a range of 0.48 to 1.00, and a total of the thickness of the outer layer cover and the thickness of the inner layer cover is in a range of 1.5 mm to 3.5 mm; and a dimple volume occupying ratio $V_R$ value is in a range of 0.66% to 0.85%.

Accordingly, the present invention provides the following multi-piece sold golf balls.

(1) A multi-piece solid golf ball including: a solid core; and a cover which has a two-layer structure of an inner layer cover and an outer layer cover and is formed in such a manner as to cover the solid core, the cover having, in its surface, a number of dimples; wherein the outer layer cover is made from a material containing a polyurethane based elastomer as a main component; a surface Shore D hardness of the solid core is in a range of 50 to 60, a Shore D hardness of the inner layer cover is in a range of 53 to 61, and a Shore D hardness of the outer layer cover is in a range of 52 to 58; an average value of the surface Shore D hardness of the solid core, the Shore D hardness of the inner layer cover, and the Shore D hardness of the outer layer cover is in a range of 53 to 58; a value obtained by dividing a thickness of the outer layer cover by a thickness of the inner layer cover is in a range of 0.48 to 1.00, and a total of the thickness of the outer layer cover and the thickness of the inner layer cover is in a range of 1.5 mm to 3.5 mm; and a dimple volume occupying ratio $V_R$ value is in a range of 0.66% to 0.85%.

(2) A multi-piece solid golf ball according to claim 1, wherein the Shore D hardness of the inner layer cover is higher than the Shore D hardness of the outer layer cover.

(3) A multi-piece solid golf ball according to claim 1 or 2, wherein the inner layer cover is made from a material containing a thermoplastic resin as a main component.

(4) A multi-piece solid golf ball according to any one of claims 1 to 3, wherein an isocyanate mixture obtained by dispersing an isocyanate compound having two or more isocyanate groups as function groups in one molecule in a thermoplastic resin substantially not reacting with the isocyanate groups is mixed in the polyurethane based elastomer for forming the outer layer cover.

DETAILED DESCRIPTION OF THE INVENTION

Hereinafter, the present invention will be described in more detail.

A multi-piece solid golf ball of the present invention has a solid core and a cover which has a two-layer structure of an inner layer cover and an outer layer cover and is formed in such a manner as to cover the solid core.

The solid core has a surface Shore D hardness in a range of 50 to 60, preferably, 52 to 58. If the surface hardness of the solid core is smaller than the lower limit of the above-described range, then the solid core is excessively soft to lower the resilience of the golf ball, with a result that the golf ball may be not flied so far. In particular, in the case of hitting the golf ball at a head speed (hereinafter, sometimes referred to as "HS") in a high HS region of 45 m/s or more, the drawback becomes significant, and good feeling upon impact may be not obtainable. If the surface hardness of the solid core is larger than the upper limit of the above-described range, particularly, the feeling characteristic upon full-shot may be degraded, or the ball controllability in the case where grass or water is sandwiched between a club face and the gold ball upon ion-shot (hereinafter, referred to as "upon flier") may be degraded.

According to the present invention, the surface Shore D hardness of the solid core is also suitably adjusted such that a value obtained by dividing a total of the surface Shore D hardness of the solid core, a Shore D hardness of the inner layer cover, and a Shore D hardness of the outer layer cover by three, that is, an average value of the Shore D hardnesses of the solid core and the inner and outer layer covers is in a range of 53 to 58. It is to be noted that the Shore D hardness of each of the inner and outer layer covers is a value obtained by molding a material for forming each of the inner and outer layer covers into a sheet and measuring a Shore D hardness of the sheet in accordance with ASTM D-2240. If the above average value is less than 53, then the gold ball cannot give good feeling upon impact to golf players of a level capable of hitting the gold ball at a high head speed (HS) of 45 m/s or more. If the above average value is more than 58, the gold ball gives hard feeling upon impact to golf players of the level capable of hitting the golf ball at a high head speed (HS) of 45 m/s or more, or makes the ball controllability upon flier poor.

The solid core can be produced from a known material by an ordinary process, wherein a vulcanizing condition, a composition, and the like are suitably adjusted in accordance with the present invention. In this case, the core composition contains a main rubber component, a crosslinking agent, co-crosslinking agent, an inactive filler, and the like. As the main rubber component, there may be used polybutadiene, which is exemplified by a natural rubber and/or a synthetic rubber having been conventionally used for solid golf balls. In particular, cis-1,4-polybutadiene having at least 40% or more of a cis-structure is preferably used as the main rubber component. Polybutadiene as the main rubber component may be suitably blended with a natural rubber, or a synthetic rubber such as polyisoprene rubber or styrene-butadiene rubber, as needed.

The solid core can be produced by kneading the solid core composition obtained by blending the above-described components in an ordinary kneader, for example, a Banbury mixer or a roll mill, compression or injection molding the solid core composition in a core mold, and suitably heating the molded body at a temperature being high sufficient to make the crosslinking agent and the co-crosslinking agent active, thereby curing the molded body such that a final solid core has a specific hardness distribution. For example, in the case of using dicumyl peroxide as the crosslinking agent and zinc acrylate as the co-crosslinking agent, the molded body is heated at a temperature usually in a range of about 130 to 170° C., preferably, 150 to 160° C. for a time in a range of 10 to 40 min, preferably, 12 to 20 min.

The surface hardness (Shore D hardness) of the solid core in the range specified according to the present invention can be obtained by suitably selecting the components of the solid core, kinds and amounts of the crosslinking agent and the co-crosslinking agent, and the vulcanizing condition.

With respect to the solid core produced by vulcanizing and curing the above-described rubber composition by an ordinary process as described above, a diameter thereof is set in a range of 35.7 mm or more, preferably, 36.1 mm or more, with the upper limit thereof being set in a range of 39.7 mm or less, preferably, 38.1 mm or less; and a weight thereof is set in a range of 27 to 31 g, preferably, 29 to 30 g.

The solid core may have a single layer structure or a multi-layer structure. In the case of using the solid core having a multi-layer structure, the surface hardness of the solid core of the present invention means the surface hardness of the outermost layer of the solid core.

According to the present invention, the cover which covers the solid core has an inner layer cover and an outer layer cover, wherein the outer layer cover is made from a material containing a polyurethane based elastomer as a main component.

According to the present invention, a Shore D hardness of the inner layer cover is set in a range of 53 to 61, preferably, 55 to 60. If the Shore D hardness of the inner layer cover is smaller than the lower limit of the above-described range, an amount of spin of the golf ball is increased and/or the resilience thereof is lowered, with a result that the golf ball may be not flied so far. If the Shore D hardness of the inner layer cover is larger than the upper limit of the above-described range, the durability against cracking after repeated hitting and the scratch resistance may be degraded.

The Shore D hardness of the inner layer cover is preferred to be higher than the Shore D hardness of the outer layer cover. This makes it possible to enhance an effect of suppressing an amount of spin upon full-shot with a driver (W#1) or an iron, and hence to further improve the flight performance. In this case, a difference in Shore D hardness between the inner layer cover and the outer layer cover is preferred to be set in a range of at least 1 or more, with the upper limit being set preferably in a range of 8 or less, more preferably, 6 or less.

According to the present invention, as described above, the Shore D hardness of the inner layer is adjusted such that a value obtained by diving a total of the surface Shore D hardness of the solid core, the Shore D hardness of the inner layer cover, and the Shore D hardness of the outer layer cover by three, that is, an average value of the Shore D hardnesses of the solid core and the inner and outer layer covers is in a range of 53 to 58.

The inner layer cover is made from a material containing a thermoplastic material as a main component. The thermoplastic material is not particularly limited but is preferably exemplified by a known ionomer resin or a thermoplastic elastomer. Examples of the thermoplastic elastomers may include a polyester based, a polyimide based, polyurethane based, an olefin based, and styrene based elastomers.

As the material of the inner layer cover, there is preferably used a mixture containing:

(f) a base resin obtained by blending (a) an olefin-unsaturated carboxylic acid binary random copolymer and/or a metal ion neutralized olefin-unsaturated carboxylic acid binary random copolymer with (b) an olefin-unsaturated carboxylic acid-unsaturated carboxylate ternary random copolymer and/or a metal ion neutralized olefin-unsaturated carboxylic acid-unsaturated carboxylate ternary random copolymer at a mass ratio ranging from 100:0 to 25:75, (e) a non-ionomer thermoplastic elastomer, (c) 5 to 80 parts by mass of a fatty acid having a molecular weight of 280 to 1500 and/or a derivative thereof, and (d) 0.1 to 10 parts by mass of a basic metal compound capable of neutralizing non-neutralized acid radicals in the base resin and the components (c).

In this case, the base resin (f) and the non-ionomer thermoplastic elastomer (e) are preferably blended with each other at a mass ratio of 100:0 to 100:100. The mixture may contain the components (f), (c) and (d), preferably, all the components (c), (d), (e), and (f). By using such a mixture as the material of the inner layer cover, it is possible to further improve the resilience and the flight performance of the golf ball.

As each of the components (a) and (b) of the base resin, there can be used a commercial product. For example, as the random copolymer of the component (a), there can be used a commercial product such as "Nucrel 1560, 1214, or 1035" (sold by Du Pont-Mitsui Polychemicals Co., Ltd.) or "ESCOR 5200, 5100, or 5000" (sold by EXXONMOBIL CHEMICAL). As the random copolymer of the component (b), there can be used a commercial product such as "Nucrel AN4311 or AN4318" (sold by Du Pont-Mitsui Polychemicals Co., Ltd.) or "ESCOR ATX325, ATX320, or ATX310" (sold by EXXONMOBIL CHEMICAL).

As the metal ion neutralized random copolymer of the component (a), there can be used a commercial product such as "Himilan 1554, 1557, 1601, 1605, 1706, or AM7311" (sold by Du Pont Polychemicals Co., Ltd.), "Surlyn 7930" (sold by E.I du Pont de Nemours and Company), or "Iotek 3110 or 4200" (sold by EXXONMOBIL CHEMICAL). As the metal ion neutralized random copolymer of the component (b), there can be used a commercial product such as "Himilan 1855, 1856, or AM7316" (sold by Du Pont Polychemicals Co., Ltd.), "Surlyn 6320, 8320, 9320, or 8120" (sold by E.I du Pont de Nemours and Company) or "Iotek 7510 or 7520" (sold by EXXONMOBIL CHEMICAL). Further, as a zinc neutralized ionomer resin suitable as the metal ion neutralized random copolymer, there can be used a commercial product such as "Himilan 1706, 1557, or AM7316".

The component (c), which is a fatty acid having a molecular weight of 280 to 1500 or a derivative thereof, is significantly smaller in molecular weight than the base resin, and contributes to adjustment of a melt vicinity of the mixture, particularly, improvement of flowability of the mixture. The component (c) of the present invention contains a relatively high amount of acid radicals (derivatives), and can suppress an excessive loss of the resilience. Examples of fatty acids of the component (c) may include stearic acid, 12-hydroxy stearic acid, behenic acid, oleic acid, linoleic acid, linolenic acid, arachidic acid, and lignoceric acid, preferably, stearic acid, arachidic acid, behenic acid, or lignoceric acid, more preferably, behenic acid.

As the basic metal compound of the component (d), a basic inorganic metal compound can be used. Examples of metal ions in the basic inorganic metal compound may include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$, and $Co^{++}$. As the basic inorganic metal compound, there can be used a known basic inorganic filler containing the above metal ion. Examples of the known basic inorganic fillers may include magnesium oxide, magnesium hydroxide, magnesium carbonate, zinc oxide, sodium hydroxide, sodium carbonate, calcium oxide, calcium hydroxide, lithium hydroxide, and lithium carbonate, preferably, those in the form of hydroxide and monoxide, more preferably, calcium hydroxide and magnesium oxide highly reactive with the base resin, most preferably, calcium hydroxide.

Examples of the components (e) may include an olefin based elastomer, a styrene based elastomer, a polyester based elastomer, an urethane based elastomer, and a polyamide based elastomer. From the viewpoint of further improving the resilience, an olefin based elastomer and a polyester based elastomer are preferably used. As the olefin based elastomer of the component (e), there can be used a commercial product such as "Dynalon" (sold by JSR Co., Ltd.), and as the polyester based elastomer of the component (e), there can be used a commercial product such as "Hytrel" (sold by Du Pont-Mitsui Polychemicals Co., Ltd.).

Various additives may be added to the above-described thermoplastic resin as needed. Examples of the additives may include a pigment, a dispersant, an antioxidant, a UV absorber, and a light stabilizer. More concretely, an inorganic filler such as zinc oxide, barium sulfate, or titanium dioxide can be used as the additive.

The outer layer cover of the present invention is made from a polyurethane based elastomer. The polyurethane based elastomer having a molecular structure generally including a high molecular polyol compound forming a soft segment, and a monomolecular chain extending agent and diisocyanate forming a hard segment.

The high molecular polyol compound is not particularly limited but is exemplified by a polyester based polyol or a polyether based polyol. In terms of resilience and low temperature characteristic, the polyether based polyol is superior to the polyester based polyol. Examples of the polyether based polyols may include polytetramethylene glycol and polypropylene glycol, preferably, polytetramethylene glycol. A number-average molecular weight of the polyether based polyol is in a range of about 1000 to 5000, preferably, 2000 to 4000.

The diisocyanate is not particularly limited but is exemplified by an aromatic diisocyanate such as 4,4'-diphenylmethane diisocyanate, 2,4-toluene diisocyanate, or 2,6-toluene diisocyanate, or an aliphatic diisocyanate such as hexamethylene diisocyanate. According to the present invention, in terms of stability of reaction with the isocyanate mixture to be described later, 4,4'-diphenylmethane diisocyanate is preferably used.

The monomolecular chain extending agent is not particularly limited but is exemplified by a usual polyalcohol or an amine. Examples of the polyalcohols and amines may include 1,4-butylene glycol, 1,2-ethylene glycol, 1,3-propylene glycol, 1,3-butane diol, 1,6-hexylene glycol, 2,2-dimethyl-1,3-propane diol, 1,3-buthylene glycol, dicyclohexylmethylmethane diamine (hydrogenated MDA), and isophorone diamine (IPDA). A number-average molecular weight of the chain extending agent is preferably in a range of 20 to 15000.

As the polyurethane based elastomer, there can be used a commercial product such as "Pandex T7298, TR3080, T8290, T8295, or T8260" (sold by DIC Bayer Polymer Ltd.) or "Resamine 2593 or 2597" (sold by Dainichiseika Color & Chemicals MFG. Co., Ltd.).

As the outer layer cover material of the present invention, there can be used a blend of the above-described polyurethane based elastomer and a specific isocyanate mixture to be described later. According to the golf ball using such an outer layer cover, as compared with a golf ball using an outer layer cover made from a material containing a single usual polyurethane elastomer as a main component, it is possible to further improve the feeling characteristic, controllability, cut resistance, scratch resistance, and durability against cracking after repeated hitting.

The above-described specific isocyanate compound is an isocyanate mixture containing (i) an isocyanate compound having two or more isocyanate groups as function groups in one molecule, and (ii) a thermoplastic resin substantially not reactive with the isocyanate groups, wherein the isocyanate compound (i) is dispersed in the thermoplastic resin (ii).

As the isocyanate compound (i), any isocyanate compound having used for a prior art polyurethane technique can be used but not limited thereto. For example, examples of aromatic isocyanate compounds may include 2,4-toluene diisocyanate, 2,6-toluene diisocyanate, a mixture thereof, 4,4'-diphenylmethane diisocyanate, m-phenylene diisocyanate, and 4,4'-biphenyl diisocyanate. A hydrogenated product of the above-described aromatic isocyanate compound, for example, dicyclohexylmethane diisocyanate can be also used. In addition, an aliphatic diisocyanate such as tetramethylene diisocyanate, hexamethylene diisocyanate (HDI), or octamethylene diisocyanate, or an alicyclic diisocyanate such as xylene diisocyanate can be used.

An added amount of the above-described isocyanate mixture is, on the basis of 100 parts by mass of the above-described polyurethane based elastomer, usually in a range of 1 part by mass or more, preferably, 5 parts by mass or more, more preferably, 10 parts by mass or more, with the upper limit being set in a range of 100 parts by mass or less, preferably, 50 parts by mass or less, more preferably, 30 parts by mass or less. If the added amount is excessively small, then sufficient crosslinking reaction cannot be obtained, thereby failing to improve the physical properties, and if the added amount is excessively large, then there occur problems that color change due to elapsed time, heat, and/or ultraviolet rays becomes large and the resilience is lowered.

The outer layer cover of the present invention, which is made from a material containing a polyurethane elastomer as a main component as described above, may further contain various known additives such as a pigment, a dispersant, an oxidation inhibitor, a UV absorber, a UV stabilizer, and a plasticizer. Further, another plastic resin such as polyester elastomer, an ionomer resin, styrene block elastomer, polyamide elastomer, polyethylene, or nylon may be suitably added to the outer layer cover. In addition, an inorganic filler such as zinc oxide, barium sulfate, or titanium dioxide can be also added to the outer layer cover.

The Shore D hardness of the outer layer cover is set in a range of 52 to 58, preferably, 53 to 56. If the hardness of the outer layer cover is smaller than the lower limit of the above range, then an amount of spin becomes excessively large, so that it fails to obtain a sufficient flight distance. If the hardness of the outer layer cover is larger than the upper limit of the above range, an amount of spin becomes excessively small, so that the controllability, durability against cracking after repeated hitting, and scratch resistance may be degraded.

The Shore D hardness of the outer layer cover is suitably adjusted such that a value obtained by dividing a total of the surface Shore D hardness of the solid core, the Shore D hardness of the inner layer cover, and the Shore D hardness of the outer layer cover by three, that is, an average of the Shore hardnesses of the solid core and the inner and outer layer covers is in a range of 53 to 58.

According to the present invention, a value obtained by dividing a thickness of the outer layer cover by a thickness of the inner layer cover is optimized in a range of 0.48 to 1.00. If the thickness ratio of the cover is smaller than the lower limit of the above range, then the durability of the ball upon topping with an iron and scratch resistance are degraded. If the thickness ratio of the cover is larger than the upper limit of the above range, then the resilience of the ball is lowered, and the durability against cracking after repeated hitting is degraded.

According to the present invention, a total of the thickness of the outer layer cover and the thickness of the inner layer cover is optimized in a range of 1.5 mm to 3.5 mm, preferably, 2.3 mm to 3.3 mm. If the total of the thicknesses of the cover is smaller than the lower limit of the above range, then the durability against cracking after repeated hitting is degraded. If the total of the thicknesses of the cover is larger than the upper limit of the above range, then the resilience of the ball is lowered, so that it fails to obtain a sufficient flight distance.

The thickness of the inner layer cover is set in a range of 1.0 mm or more, preferably, 1.3 mm or more, with the upper limit being set in a range of 2.0 mm or less, preferably, 1.8 mm or less.

The thickness of the outer layer cover is set in a range of 0.3 mm or more, preferably, 1.0 mm or more, with the upper limit being set in a range of 1.7 mm or less, preferably, 1.6 mm or less.

To improve the durability upon hitting, an adhesive layer can be provided between the inner layer cover and the outer layer cover. If each of the materials for forming the inner and outer layer covers has an adhesive property sufficient for adhesive bonding between the inner and outer layer covers, it is not required to provide the above adhesive layer. An adhesive for forming the adhesive layer is not particularly limited but is exemplified by an epoxy resin based adhesive, a vinyl resin based adhesive, or a rubber based adhesive. In particular, a urethane resin based adhesive or a chlorinated polyolefin based adhesive is preferably used as the above adhesive. Further, as the above adhesive, there can be used a commercial product such as "Resamine D6208" (urethane resin based adhesive: sold by Dainichiseika Color & Chemicals Mfg. Co., Ltd.) or "RB182 Primer" (chlorinated polyolefin based adhesive: sold by Nippon Bee Chemical Co., Ltd.).

The adhesive layer can be formed by dispersion painting. A kind of emulsion used for the dispersion paining is not limited. As a resin powder for preparing emulsion, there can be used either a thermoplastic resin powder or a thermosetting resin powder. Examples of the resins for the resin powders may include vinyl acetate resin, vinyl acetate copolymer resin, EVA (ethylene-vinyl acetate copolymer resin), acrylate polymer (copolymer) resin, epoxy resin, thermosetting urethane resin, and thermoplastic urethane resin, preferably, epoxy resin, thermosetting urethane resin, thermoplastic urethane resin, and acrylate polymer (copolymer) resin, more preferably, thermoplastic urethane resin.

A thickness of the adhesive layer is set in a range of 0.1 $\mu$m or more, preferably, 0.2 $\mu$m or more, with the upper limit being set in a range of 30 $\mu$m or less, preferably, 25 $\mu$m or less.

According to the present invention, a number of dimples are formed in the ball surface. The total number and the arrangement pattern of the dimples are not particularly limited; however, a dimple volume occupying ratio $V_R$ value is set in a range of 0.66% or more, preferably, 0.70% or more, more preferably, 0.74% or more, with the upper limit being set in a range of 0.85% or less, preferably, 0.82% or less, more preferably, 0.79% or less. If the $V_R$ value is smaller than the lower limit of the above range, then the trajectory form of the ball is liable to be curved up, to shorten the total flight distance. If the $V_R$ value is larger than the upper limit of the above range, then the trajectory becomes excessively low, to shorten both the carry and total distance.

The dimple volume occupying ratio $V_R$ value is expressed by a ratio (%) of a total of dimple space volumes under plane surfaces surrounded by edge portions of the dimples to a volume of a virtual ball which is the same as the golf ball except that the virtual ball has no dimples in its surface. The dimple volume occupying ratio $V_R$ value has the same meaning as that of a dimple volume occupying ratio $V_R$ value which has been defined, in Japanese Patent Laid-open No. Hei 9-290034, as follows:

"Assuming that a volume of a virtual ball being the same as the golf ball except that the virtual ball has no dimples in its surface is taken as A $mm^3$ and a total of dimple volumes provided in the overall surface of the golf ball is taken as B $mm^3$, the dimple volume occupying ratio $V_R$ is defined as a ratio of the total volumes of all the dimples to the volume of the golf ball, which ratio is expressed by (B/A)×100."

The golf ball of the present invention can be produced with its diameter and weight specified under a golf rule for golf games. Concretely, the golf ball can be produced with its diameter specified in a range of 42.67 mm or more and its weight specified in a range of 45.93 g or less.

EXAMPLE

Hereinafter, the present invention will be more fully described by way of inventive examples and comparative examples, but limited thereto.

Examples 1 to 5, Comparative Examples 1 to 15

Solid cores in Examples 1 to 5 and Comparative Examples 1 to 15 were each produced by vulcanizing the corresponding core composition containing polybutadiene (trade name "BR11", sold by JSR Co., Ltd.) as a main component shown in Tables 1 and 2 at a vulcanizing temperature of 157° C. for a vulcanizing time of 15 min. An outside diameter and a surface hardness of each solid core thus obtained were measured.

For each of the solid cores, an inner layer cover was molded on the surface of the solid core by using the corresponding cover composition shown in Table 3 in accordance with injection molding, followed by painting of an adhesive on the surface of the inner layer cover as needed, and an outer layer cover was molded on the inner layer cover by using the corresponding cover composition shown in Table 4. It is to be noted that, for the golf ball in Comparative Example 14, the inner layer cover was molded by injection molding such that the outer diameter thereof became excessively large, and then the surface of the inner layer cover was polished such that the thickness of the inner layer cover became a value shown in Table 6.

Dimples were then formed in the surface of the outer layer cover, to produce each of solid golf balls shown in Tables 5 and 6.

TABLE 1

|  |  | Examples | | | | | Comparative Examples | | | | |
|---|---|---|---|---|---|---|---|---|---|---|---|
|  |  | 1 | 2 | 3 | 4 | 5 | 1 | 2 | 3 | 4 | 5 |
| Composition of core (parts by mass) | polybutadiene | 100 | 100 | 100 | 100 | 100 | 100 | 100 | 100 | 100 | 100 |
|  | Zinc acrylate | 34.1 | 31.4 | 34.1 | 34.1 | 31.4 | 31.4 | 29.3 | 34.1 | 26.7 | 34.1 |
|  | Peroxide (1) | 0.6 | 0.6 | 0.6 | 0.6 | 0.6 | 0.6 | 0.6 | 0.6 | 0.6 | 0.6 |
|  | Peroxide (2) | 0.6 | 0.6 | 0.6 | 0.6 | 0.6 | 0.6 | 0.6 | 0.6 | 0.6 | 0.6 |
|  | Antioxidant | 0.2 | 0.2 | 0.2 | 0.2 | 0.2 | 0.2 | 0.2 | 0.2 | 0.2 | 0.2 |
|  | Zinc oxide | 18.0 | 19.3 | 18.0 | 18.0 | 19.3 | 19.3 | 20.0 | 18.0 | 29.8 | 27.1 |
|  | Zinc salt of pentachloro thiophenol | 1 | 1 | 1 | 1 | 1 | 1 | 1 | 1 | 0.2 | 1 |
|  | Zinc stearate | 5 | 5 | 5 | 5 | 5 | 5 | 5 | 5 | 0 | 5 |

TABLE 2

|  |  | Comparative Examples | | | | | | | | | |
|---|---|---|---|---|---|---|---|---|---|---|---|
|  |  | 6 | 7 | 8 | 9 | 10 | 11 | 12 | 13 | 14 | 15 |
| Composition of core (parts by mass) | polybutadiene | 100 | 100 | 100 | 100 | 100 | 100 | 100 | 100 | 100 | 100 |
|  | Zinc acrylate | 34.1 | 29.3 | 24.5 | 38.0 | 29.3 | 37.2 | 31.7 | 31.7 | 29.3 | 29.3 |
|  | Peroxide (1) | 0.6 | 0.6 | 0.6 | 0.6 | 0.6 | 0.6 | 0.6 | 0.6 | 0.6 | 0.6 |
|  | Peroxide (2) | 0.6 | 0.6 | 0.6 | 0.6 | 0.6 | 0.6 | 0.6 | 0.6 | 0.6 | 0.6 |
|  | Antioxidant* | 0.2 | 0.2 | 0.2 | 0.2 | 0.2 | 0.2 | 0.2 | 0.2 | 0.2 | 0.2 |
|  | Zinc oxide | 16.4 | 17.9 | 21.8 | 16.2 | 19.8 | 19.4 | 22.7 | 17.4 | 13.1 | 20.7 |
|  | Zinc salt of pentachloro thiophenol | 1 | 1 | 1 | 1 | 1 | 1 | 1 | 1 | 1 | 1 |
|  | Zinc stearate | 5 | 5 | 5 | 5 | 5 | 5 | 5 | 5 | 5 | 5 |

TABLE 3

| Composition of cover material (parts by mass) | | ① | ② | ③ | ④ | ⑤ | ⑩ | ⑪ |
|---|---|---|---|---|---|---|---|---|
| | Surlyn 9650 | | | | | 35 | | |
| | Surlyn 8660 | | | | | 35 | | |
| | Himilan 1706 | | | | 50 | | | |
| | Himilan 1650 | | | | | | | 50 |
| | Himilan 1557 | | | 20 | | | 50 | |
| | Himilan 1605 | 65 | 85 | | 50 | | | |
| | Himilan 1601 | | | | | | 50 | |
| | Himilan 1855 | | | 30 | | | | |
| | Surlyn 8120 | | | 30 | | | | 50 |
| | Nucrel AN4311 | | | 20 | | | | |
| | Dynalon 6100P | 35 | 15 | | | 30 | | |
| | Behenic acid | 20 | 20 | | 20 | | | |
| | Calcium hydroxide | 2.4 | 2.9 | | 2.5 | | | |
| | Titanium dioxide | | | 2.5 | | 2.0 | 2.5 | 2.5 |

TABLE 4

| Composition of cover material (parts by mass) | | ⑥ | ⑦ | ⑧ | ⑨ | ⑫ |
|---|---|---|---|---|---|---|
| | Himilan 1706 | | | | | 25 |
| | Himilan 1605 | | | | | 25 |
| | Pandex T7298 | | | | 50 | 50 |
| | Pandex TR3080 | | | | 50 | |
| | Pandex T8295 | 50 | 25 | 25 | | |
| | Pandex T8290 | | | 25 | | |
| | Pandex T8260 | 50 | 75 | 50 | | |
| | Isocyanate compound | | | | 1.5 | 0.75 |
| | Titanium diode | 4 | 4 | 4 | 4 | 4 |
| | Polyethylene wax | 1.5 | 1.5 | 1.5 | 1.5 | 0.75 |
| | Isocyanate mixture | 10 | 10 | 10 | | |

TABLE 5

| | | Examples | | | | | Comparative Examples | | | | |
|---|---|---|---|---|---|---|---|---|---|---|---|
| | | 1 | 2 | 3 | 4 | 5 | 1 | 2 | 3 | 4 | 5 |
| Solid core | Outer diameter (mm) | 36.40 | 36.43 | 36.40 | 36.40 | 36.43 | 36.43 | 36.40 | 36.40 | 36.40 | 36.40 |
| | Core surface hardness (Shore D) | 57 | 53 | 57 | 57 | 53 | 53 | 50 | 57 | 51 | 57 |
| Inner cover | Material | ① | ① | ② | ① | ① | ① | ① | ① | ① | ① |
| | Shore D hardness | 56 | 56 | 60 | 56 | 56 | 56 | 56 | 56 | 56 | 56 |
| | Thickness (mm) | 1.65 | 1.65 | 1.65 | 1.65 | 1.63 | 1.63 | 1.60 | 1.70 | 1.65 | 1.65 |
| Outer cover | Material | ⑥ | ⑥ | ⑥ | ⑦ | ⑧ | ⑧ | ⑥ | ⑨ | ⑩ | ⑪ |
| | Shore D hardness | 54 | 54 | 54 | 55 | 52 | 52 | 54 | 45 | 60 | 55 |
| | Thickness (mm) | 1.50 | 1.48 | 1.50 | 1.50 | 1.50 | 1.50 | 1.55 | 1.45 | 1.50 | 1.50 |
| Presence or absence of adhesive inside and outside of cover | | Presence | Presence | Presence | Presence | Presence | Presence | Presence | Presence | Absence | Absence |
| Ball product | Outside diameter (mm) | 42.7 | 42.7 | 42.7 | 42.7 | 42.7 | 42.7 | 42.7 | 42.7 | 42.7 | 42.7 |
| | Weight (g) | 45.3 | 45.3 | 45.4 | 45.3 | 45.4 | 45.4 | 45.4 | 45.4 | 45.4 | 45.3 |
| | Dimple volume occupying ratio ($V_R$%) | 0.76 | 0.76 | 0.76 | 0.76 | 0.76 | 1.00 | 0.60 | 0.76 | 0.76 | 0.76 |
| Average hardness | | 56 | 54 | 57 | 56 | 54 | 54 | 53 | 53 | 56 | 56 |
| Thickness of outer cover/ Thickness of inner cover | | 0.91 | 0.90 | 0.91 | 0.91 | 0.92 | 0.92 | 0.97 | 0.85 | 0.91 | 0.91 |

TABLE 5-continued

|  | Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| Thickness of outer cover + Thickness of inner cover (mm) | 3.15 | 3.13 | 3.15 | 3.15 | 3.13 | 3.13 | 3.15 | 3.15 | 3.15 | 3.15 |

TABLE 6

|  |  | Comparative Examples | | | | | | | | | |
| --- | --- | --- | --- | --- | --- | --- | --- | --- | --- | --- | --- |
|  |  | 6 | 7 | 8 | 9 | 10 | 11 | 12 | 13 | 14 | 15 |
| Solid core | Outer diameter (mm) | 36.40 | 36.60 | 36.40 | 36.40 | 36.40 | 36.40 | 36.30 | 36.40 | 39.90 | 35.50 |
|  | Core surface hardness (Shore D) | 57 | 50 | 44 | 62 | 50 | 61 | 54 | 54 | 50 | 50 |
| Inner cover | Material | ③ | ④ | ② | ② | ⑤ | ② | ① | ① | ① | ① |
|  | Shore D hardness | 50 | 63 | 60 | 60 | 53 | 60 | 56 | 56 | 56 | 56 |
|  | Thickness (mm) | 1.65 | 1.55 | 1.65 | 1.65 | 1.65 | 1.65 | 2.20 | 1.45 | 0.40 | 1.80 |
| Outer cover | Material | ⑧ | ⑥ | ⑥ | ⑧ | ⑧ | ⑫ | ⑥ | ⑧ | ⑥ | ⑥ |
|  | Shore D hardness | 52 | 54 | 54 | 52 | 52 | 57 | 54 | 52 | 54 | 54 |
|  | Thickness (mm) | 1.50 | 1.50 | 1.50 | 1.50 | 1.50 | 1.50 | 1.00 | 1.70 | 1.00 | 1.80 |
| Presence or absence of adhesive inside and outside of cover |  | Presence | Presence | Presence | Presence | Presence | Presence | Presence | Presence | Presence | Presence |
| Ball product | Outside diameter (mm) | 42.7 | 42.7 | 42.7 | 42.7 | 42.7 | 42.7 | 42.7 | 42.7 | 42.7 | 42.7 |
|  | Weight (g) | 45.4 | 45.2 | 45.4 | 45.4 | 45.3 | 45.3 | 45.3 | 45.3 | 45.3 | 45.3 |
|  | Dimple volume occupying ratio ($V_R$%) | 0.76 | 0.76 | 0.76 | 0.76 | 0.76 | 0.76 | 0.76 | 0.76 | 0.76 | 0.76 |
| Average hardness |  | 53 | 56 | 53 | 58 | 52 | 59 | 55 | 54 | 53 | 53 |
| Thickness of outer cover/ Thickness of inner cover |  | 0.91 | 0.97 | 0.91 | 0.91 | 0.91 | 0.91 | 0.45 | 1.17 | 2.50 | 1.00 |
| Thickness of outer cover + Thickness of inner cover (mm) |  | 3.15 | 3.05 | 3.15 | 3.15 | 3.15 | 3.15 | 3.20 | 3.15 | 1.40 | 3.60 |

The peroxides (1) and (2) and the antioxidant in Tables 1 and 2 are as follows:

Peroxide (1): dicumyl peroxide (trade name: Percumyl D, sold by NOF CORPORATION)

Peroxide (2): 1,1-bis(t-butylperoxy)3,3,5-trimethylsiloxane (trade name: Perhexa 3M-40 (NOF CORPORATION)

* antioxidant: NOCRAC NS-6 (sold by Ouchi-Sinko Chemical Industrial Co., Ltd.)

The product names and material names in Tables 3 and 4 are as follows:

"Surlyn" series: ionomer resin, sold by E.I du Pont de Nemours and Company

"Himilan" series: ionomer resin, sold by Du Pont-Mitsui Polychemicals Co., Ltd.

"Pandex" series: thermoplastic polyurethane elastomer, sold by DIC Bayer Polymer Ltd.

"Dynalon 6100P": olefin based thermoplastic elastomer, sold by JSR Co., Ltd.

"Nucrel AN4311": ethylene-methacrylic acid-acrylate ternary copolymer, sold by Du Pont-Mitsui Polychemicals Co., Ltd.

"behenic acid": "NAA-222S" (trade name), sold by NOF CORPORATION

"calcium hydroxide": "CLS-B" (trade name), sold by Shiraishi Kogyo Kaisha, Ltd.

The isocyanate mixture and isocyanate compound in Table 4 are as follows:

Isocyanate Mixture

Cronate EM30 (trade name): isocyanate master batch, sold by Daiichiseika Color & Chemicals Mfg. Co., Ltd. [containing 30 mass % of 4,4'-diphenylmethane diisocyanate (isocyanate concentration measured by amine back titration under JIS-K1556: 5 to 10 mass %), wherein the master batch base resin is polyester elastomer]

Isocyanate Compound

Desmodule W (trade name): hydrogenated MDI, dicyclohexylmethane-4,4'-diisocyanate, sold by AIC Japan Ltd.

It is to be noted that the isocyanate mixture was kneaded in the other cover material simultaneously with injection molding, and the isocyanate compound was pre-kneaded by extruder.

In Tables 5 and 6,

*1: The hardness of the core surface was measured under ASTM D-2240

*2: A seat (2 mm) was formed by injection molding under the same temperature condition as that in which the solid cover was covered with the outer layer cover and was left for about 2 weeks, and then the hardness of the sheet was measured under ASTM D-2240

*3: "RB-182 Primer" (sold by Nippon Bee Chemical Co., Ltd.) was used as the adhesive layer between the inner layer cover and the outer layer cover.

*4: average hardness (surface hardness of solid core+hardness of inner layer cover+hardness of outer layer cover)÷3, that is, average value of Shore D hardnesses of respective layers Characteristics of each golf ball were evaluated as follows. The results are shown in Tables 7 and 8.

TABLE 7

| Ball performance | | Examples | | | | | Comparative Examples | | | | |
|---|---|---|---|---|---|---|---|---|---|---|---|
| | | 1 | 2 | 3 | 4 | 5 | 1 | 2 | 3 | 4 | 5 |
| Flight Performance w#1 HS = 50 | Carry (m) | 258.2 | 256.1 | 258.1 | 256.8 | 254.7 | 242.5 | 250.0 | 255.6 | 254.5 | 257.4 |
| | Total (m) | 266.0 | 263.7 | 266.9 | 264.9 | 262.8 | 253.3 | 256.1 | 258.5 | 263.0 | 265.0 |
| | Spin (rpm) | 2896 | 2846 | 2868 | 2857 | 2924 | 2924 | 2805 | 3248 | 2585 | 2857 |
| | Evaluation | ○ | ○ | ○ | ○ | ○ | x | x | x | ○ | ○ |
| Controllability I#9 HS = 38 | Spin (rpm) | 9727 | 9450 | 9706 | 9659 | 9584 | 9589 | 9224 | 10331 | 8905 | 9659 |
| | Evaluation | ○ | ○ | ○ | ○ | ○ | ○ | ○ | ○ | x | ○ |
| Performance upon flier | Spin (rpm) | 4312 | 4375 | 4240 | 4200 | 4601 | 4603 | 4419 | 5371 | 3526 | 3951 |
| | Spin retention ratio (%) | 44.3 | 46.3 | 43.7 | 43.5 | 48.0 | 48.0 | 47.9 | 52.0 | 39.6 | 40.9 |
| | Evaluation | ○ | ○ | ○ | ○ | ○ | ○ | ○ | ○ | x | x |
| Controllability Sw HS = 20 | Spin (rpm) | 5990 | 5898 | 5960 | 5925 | 6028 | 6024 | 5823 | 6574 | 5461 | 5925 |
| | Evaluation | ○ | ○ | ○ | ○ | ○ | ○ | ○ | ○ | x | ○ |
| Feeling | W#1 | ○ | ○ | ○ | ○ | ○ | ○ | ○ | ○ | ○ | ○ |
| | I#9 | ○ | ○ | ○ | ○ | ○ | ○ | ○ | ○ | ○ | ○ |
| | PT | ○ | ○ | ○ | ○ | ○ | ○ | ○ | ○ | x | ○ |
| Durability until reduction of resilience by repeated hitting | | ○ | ○ | ○ | ○ | ○ | ○ | ○ | ○ | x | ○ |
| Scratch resistance | | ○ | ○ | ○ | ○ | ○ | ○ | ○ | ○ | x | x |
| Durability upon topping with iron | | ○ | ○ | ○ | ○ | ○ | ○ | ○ | ○ | ○ | ○ |

TABLE 8

| Ball performance | | Comparative Examples | | | | | | | | | |
|---|---|---|---|---|---|---|---|---|---|---|---|
| | | 6 | 7 | 8 | 9 | 10 | 11 | 12 | 13 | 14 | 15 |
| Flight Performance w#1 HS = 50 | Carry (m) | 254.5 | 254.5 | 252.2 | 259.1 | 249.9 | 256.9 | 257.9 | 253.1 | 253.2 | 254.9 |
| | Total (m) | 259.9 | 263.1 | 259.2 | 267.1 | 259.5 | 265.1 | 266.5 | 259.3 | 264.1 | 258.2 |
| | Spin (rpm) | 3017 | 2755 | 2685 | 3022 | 2904 | 2831 | 2875 | 2929 | 2775 | 2956 |
| | Evaluation | x | ○ | x | ○ | x | ○ | ○ | x | ○ | x |
| Controllability I#9 HS = 38 | Spin (rpm) | 9892 | 9187 | 8700 | 10259 | 9374 | 9873 | 9475 | 9609 | 9254 | 9323 |
| | Evaluation | ○ | Δ | x | ○ | ○ | ○ | ○ | ○ | ○ | ○ |
| Performance upon flier | Spin (rpm) | 4649 | 4299 | 4425 | 4350 | 4696 | 3841 | 4179 | 4661 | 4340 | 4522 |
| | Spin retention ratio (%) | 47.0 | 46.8 | 50.9 | 42.4 | 50.1 | 38.9 | 44.1 | 48.5 | 46.9 | 48.5 |
| | Evaluation | ○ | ○ | ○ | x | ○ | x | ○ | ○ | ○ | ○ |
| Controllability Sw HS = 20 | Spin (rpm) | 6164 | 5771 | 5626 | 6229 | 5975 | 5909 | 5906 | 6036 | 5823 | 5823 |
| | Evaluation | ○ | ○ | ○ | ○ | ○ | ○ | ○ | ○ | ○ | ○ |
| Feeling | W#1 | ○ | ○ | x | x | x | x | ○ | ○ | ○ | ○ |
| | I#9 | ○ | ○ | Δ | ○ | Δ | x | ○ | ○ | ○ | ○ |
| | PT | ○ | ○ | ○ | ○ | ○ | ○ | ○ | ○ | ○ | ○ |

TABLE 8-continued

| Ball performance | Comparative Examples | | | | | | | | | |
|---|---|---|---|---|---|---|---|---|---|---|
| | 6 | 7 | 8 | 9 | 10 | 11 | 12 | 13 | 14 | 15 |
| Durability until reduction of resilience by repeated hitting | ○ | X | ○ | ○ | ○ | X | ○ | ○ | X | ○ |
| Scratch resistance | ○ | Δ | ○ | ○ | ○ | X | X | ○ | Δ | ○ |
| Durability upon topping with iron | ○ | ○ | ○ | ○ | ○ | ○ | X | ○ | Δ | ○ |

Flight Performance

A flight distance (carry and total flight distance) of each golf ball hit with a driver (W#1) at an HS=50 m/s was measured and evaluated under the following criterion. As the driver, there was used TourStage X500 (loft angle: 8°) sold by Bridgestone Sports Co., Ltd.
 ○: good (total flight distance: 260 m or more)
 X: poor (total flight distance: less than 260 m)

Ball Controllability

1) An amount of spin of each golf ball upon iron-shot with #9 iron (I#9, sold by Bridgestone Sports Co., Ltd., J's Classical Edition) at an HS=38 m/s was measured and evaluated under the following criterion:
 ○: spin amount of 9200 rpm or more
 Δ: spin amount of 9000 rpm or more and less than 9200 rpm
 X: spin amount of less than 9000 rpm 2) An amount of spin of each golf ball upon approach-shot with a side wedge (SW, sold by Bridgestone Sports Co., Ltd., J's Classical Edition) at an HS=20 m/s was measured and evaluated under the following criterion:
 ○: spin amount of 5800 rpm or more
 X: spin amount of less than 5500 rpm Controllability Upon Flier The golf ball was hit under the same condition as the condition for testing the above-described ball controllability except that "Prescale" (a medium pressure prescale formed by a pressure measuring film, sold by Fuji Photo Film Co., Ltd.) was stuck on a face portion of a club, and an amount of spin of the golf ball was measured and evaluated under the following criterion. It is to be noted that this test was performed for simulating a state that glass is sandwiched between a club face and the gold ball by using the prescale.
 ○: spin retention ratio* of 43% or more
 X: spin retention ratio of less than 43%

* The spin retention ratio is defined as (spin amount in the case where the prescale is stuck on the club face)÷(spin amount in the case where the prescale is not stuck on the club face)×100

Feeling

Three professional golfers hit each golf ball by using a driver (W#1), a #9 iron (I#9), and a putter (PT), and each feeling upon impact was evaluated under the following criterion:
 ○: evaluated by three players such that the feeling is good
 Δ: evaluated by one or two of three players such that the feeling is excessively hard or soft and therefore the feeling is poor
 X: evaluated by three players such that the feeling is excessively hard or soft and therefore the feeling is poor Durability Until Reduction of Initial Velocity by Repeated Hitting Each ball was repeatedly hit with a driver (W#1) at an HS=50 m/s, and the durability was decided by the number of hitting repeated until the resilience of the ball was continuously reduced by 3%.
 ○: 80 or more (based on the durability index in Example 2 taken as 100)
 X: less than 80 (based on the durability index in Example 2 taken as 100)

Scratch Resistance

Each ball was hit at a time with a pitching wedge (PW) having a square groove at an HS=45 m/s, and the state of the ball surface was evaluated under the following criterion:
 ○: usable yet
 Δ: difficult to be decided whether or not the ball is usable
 X: not usable because of damage on the ball surface Durability Upon Iron-Shot A portion, around an equatorial line, of each ball was hit with a pitching wedge (PW) at an HS=45 m/s, and the state of the ball was evaluated under the following criterion:
 ○: usable yet
 Δ: conspicuous damage on ball surface
 X: not usable because of damage on ball surface From the result shown in Table 7, it was revealed that the golf ball of the present invention has no drawback in flight performance, feeling characteristic, and ball controllability not only upon normal impact but also upon flier with a short iron such as a #9 iron or a sand wedge, and further has no drawback in scratch resistance and durability against repeated hitting, and therefore, the golf ball of the present invention has generally excellent ball characteristics. On the contrary, from the results shown in Tables 7 and 8, it was revealed that each of the golf balls in Comparative Examples 1 to 15 has drawbacks that the flight distance cannot be obtained, the feeling is excessively hard, and one of the durability against cracking, scratch resistance, the spin retention ratio at the time of flight of the ball (ball controllability) is degraded, and therefore, each of the golf balls in Comparative Examples 1 to 15 has not generally excellent ball characteristics.

As described above, according to the multi-piece sold golf ball of the present invention, it is possible to enhance not only the flight performance, feeling characteristic, and the ball controllability upon normal impact with a short iron such as a #9 iron or a sand wedge but also the ball controllability when grass or the like is sandwiched between a club face and the golf ball upon iron-shot (upon flier), and to improve the scratch resistance and the durability against repeated hitting of the golf ball.

What is claimed is:

1. A multi-piece solid golf ball comprising:
  a solid core formed of a single layer structure; and
  a cover which has a two-layer structure of an inner layer cover and an outer layer cover and is formed in such a manner as to cover said solid core, said cover having, in its surface, a number of dimples;

wherein said inner layer cover is made from a material containing an ionomer resin as a main component and an olefin based elastomer and said outer layer cover is made from a material containing a polyurethane based elastomer as a main component;

a surface Shore D hardness of said solid core is in a range of 50 to 60, a Shore D hardness of said inner layer cover is in a range of 53 to 61, and a Shore D hardness of said outer layer cover is in a range of 54 to 58;

an average value of the surface Shore D hardness of said solid core, the bore D hardness of said inner layer cover, and the Shore D hardness of the outer layer cover is in a range of 53 to 58;

a value obtained by dividing a thickness of said outer layer cover by a thickness of said inner layer cover is in a range of 0.48 to 1.00, and a total of the thickness of said outer layer cover and the thickness of said inner layer cover is in a range of 1.5 mm to 3.5 mm; and a dimple volume occupying ratio $V_R$ value is in a range of 0.66% to 0.85%.

2. A multi-piece solid golf ball according to claim 1, wherein the Shore D hardness of said inner layer cover is higher than the Shore D hardness of said outer layer cover.

3. A multi-piece solid golf ball according to claim 2, wherein the difference in Shore D hardness between the inner layer cover and the outer lay cover is from 1 to 8.

4. A multi-piece solid golf ball according to claim 1, wherein an isocyanate mixture obtained by dispersing an isocyanate compound having two or more isocyanate groups as function groups in one molecule in a thermoplastic resin substantially not reacting with said isocyanate groups is mixed in said polyurethane based elastomer for forming said outer layer cover.

5. A multi-piece solid golf ball according to claim 1, wherein said core is formed of a composition comprising a main rubber component, a crosslinking agent, co-crosslinking agent, and an inactive filler.

6. A multi-piece solid golf ball comprising:

a solid core formed of a single layer structure; and a cover which has a two-layer structure of an inner layer cover and an outer layer cover and is formed in such a manner as to cover said solid core, said cover having, in its surface, a number of dimples;

wherein said outer layer cover is made from a material containing a polyurethane based elastomer as a main component;

a surface Shore D hardness of said solid core is in a range of 50 to 60, a Shore D hardness of said inner layer cover is in a range of 53 to 61, and a Shore D hardness of said outer layer cover is in a range of 52 to 58;

an average value of the surface Shore D hardness of said solid core, the Shore D hardness of said inner layer cover, and the Shore D hardness of the outer layer cover is in a range of 53 to 58;

a value obtained by dividing a thickness of said outer layer cover by a thickness of said inner layer cover is in a range of 0.48 to 1.00, and a total of the thickness of said outer layer cover and the thickness of said inner layer cover is in a range of 1.5 mm to 3.5 mm; and a dimple volume occupying ratio $V_R$ value is in a range of 0.66% to 0.85%, wherein the inner layer cover is formed of mixture comprising, (f) a base resin obtained by blending (a) an olefin-unsaturated carboxyl acid binary random copolymer and/or a metal ion neutralized olefin-unsaturated carboxylic acid binary random copolymer with (b) an olefin-unsaturated carboxylic acid-unsaturated carboxylate ternary random copolymer and/or a metal ion neutralized olefin-unsaturated carboxylic acid-unsaturated carboxylate ternary random copolymer at a mass ratio ranging from 100:0 to 25:75;

(e) a non-ionomer thermoplastic elastomer, (c) 5 to 80 parts by mass of a fatty acid having a molecular weight of 280 to 1500 and/or a derivative thereof, and (d) 0.1 to 10 parts by mass of a basic metal compound capable of neutralizing non-neutralized acid radicals in the base resin and the components (c).

7. A multi-piece solid golf ball according to claim 6, wherein the base resin (f) and the non-ionomer thermoplastic elastomer (e) are blended with each other at a mass ratio of 100:0 to 100:100.

8. A multi-piece solid golf ball comprising:

a solid core; and a cover which has a two-layer structure of an inner layer cover and an outer layer cover and is formed in such a manner as to cover said solid core, said cover having, in its surface, a number of dimples;

wherein said outer layer cover is made from a material containing polyurethane based elastomer as a main component;

a surface Shore D hardness of said solid core is in a range of 50 to 60, a Shore D hardness of said inner layer cover is in a range of 53 to 61, and a Shore D hardness of said outer layer cover is in a range of 52 to 58;

an average value of the surface Shore D hardness of said solid core, the shore D hardness of said inner layer cover, and the Shore D hardness of the outer layer cover is in a range of 53 to 58;

a value obtained by dividing a thickness of said outer layer cover by a thickness of said inner layer cover is in a range of 0.48 to 1.00, and a total of the thickness of said outer layer cover and the thickness of said inner layer cover is in a range of 1.5 mm to 3.5 mm; and a dimple volume occupying ratio $V_R$ value is in a range of 0.66% to 0.85%, wherein an isocyanate mixture obtained by dispersing an isocyanate compound having two or more isocyanate groups as function groups in one molecule in a thermoplastic resin substantially not reacting with said isocyante groups is mixed in said polyurethane based elastomer for forming said outer layer cover.

* * * * *